United States Patent [19]

Honda

[11] Patent Number: 4,675,066
[45] Date of Patent: Jun. 23, 1987

[54] METHOD OF BONDING VENEER SHEETS AND APPARATUS THEREFOR

[75] Inventor: Noriyuki Honda, Ohbu, Japan

[73] Assignee: Meinan Machinery Works, Inc., Aichi, Japan

[21] Appl. No.: 782,367

[22] Filed: Oct. 1, 1985

[30] Foreign Application Priority Data

Oct. 2, 1984 [JP] Japan .............................. 59-206598
Oct. 24, 1984 [JP] Japan .............................. 59-223632

[51] Int. Cl.⁴ ............................................. B32B 31/20
[52] U.S. Cl. ................................. 156/285; 100/93 P; 156/291; 156/382; 156/581; 156/583.1
[58] Field of Search ............ 100/93 P, 295; 156/251, 156/285, 291, 382, 581, 583.1

[56] References Cited

U.S. PATENT DOCUMENTS

| | | | |
|---|---|---|---|
| 3,361,608 | 1/1968 | Janetos et al. | 100/93 P X |
| 3,562,066 | 2/1971 | St. Denny | 156/251 X |
| 4,396,451 | 8/1983 | Yeager | 156/285 |
| 4,517,147 | 5/1985 | Taylor et al. | 156/285 X |

*Primary Examiner*—Robert A. Dawson
*Attorney, Agent, or Firm*—Brumbaugh, Graves, Donohue & Raymond

[57] ABSTRACT

A method and apparatus for bonding veneer sheets is disclosed. It comprises stacking up a plurality of veneer sheets with water soluble thermosetting adhesive interposed at desired locations between the veneer sheets; pressing the veneer sheets from both above and below surfaces thereof; sealing the gap defined by the two opposing plates in the vicinity of the peripheral portions of the veneer sheets in an air-tight manner; heating the bonding agent at a temperature of a boiling point or more of water in its normal state; and hardening the adhesive while preventing the same from foaming.

2 Claims, 9 Drawing Figures

FIG. 5

METHOD OF BONDING VENEER SHEETS AND APPARATUS THEREFOR

BACKGROUND OF THE INVENTION

The present invention relates to a method of bonding a plurality of veneer sheets by using water soluble thermosetting adhesive for producing plywood, etc. and an apparatus for carrying out the method.

Heretofore, a plurality of veneer sheets are interposed at desired locations with water soluble thermosetting adhesive and pressed from above and below. At the same time, the thermosetting adhesive is heated and hardened for bonding the veneer sheets. When plywood or composite wood products are manufactured, as shown in Japanese Patent Publication (Kokoku Koho) No. 55(1980)-389998 entitled "Bonding Agent for Plywood using Hop Lees", it is known that such water soluble thermosetting adhesive chiefly comprises, for example, urea resin, melamine resin, phenol resin, or a condensation resin and/or a mixed resin, etc. to which is added a suitable quantity of water, extending agent, hardening agent, etc. according to necessity. Hardening reaction of these resins, for example, urea resin is carried out at a high temperature such as around 100° C. Likewise, phenol resins are hardened at a temperature of around 130° C. In addition, the hardening reaction is made effectively and promptly. Accordingly, the heating temperature of the bonding agent is preferably set to be the boiling point or more of water in its normal state.

On the other hand, there is known a heating type bonding method for bonding veneer sheets by heating the adhesive and hardening thereof with the veneer sheets pressed from below and above. One such example is Japanese Utility Model Application Publication (Kokoku Koho) No. 54(1979)-40545, wherein the so-called hot press method is adapted for pressing stacked veneer sheets from above and below by hot plates. This hot press process is most convenient and widely adopted. However, the conventional multistage or single stage hot press is directly exposed to the air at least at part of the bonding surface of the veneer sheets during the hot pressing operation. Moreover, it has a gas permeability between the air and itself because of existence of vessels within the wooden material. This means that the veneer sheets are substantially in exposed relation with the air.

However, the inventor of the present invention has found out during the course of making the invention the fact that when veneer sheets are bonded by the aforementioned conventional hot press by heating water soluble thermosetting adhesive at a temperature above the boiling point of water in its normal state, hardening of the adhesive is extremely adversely affected.

That is, when the temperature of the adhesive is heated up to or more than the boiling point of water (in the vicinity of 100° C.), moisture contained in the adhesive is boiled and evaporated which causes the adhesive to foam. Moreover, since the bonding surfaces of the veneer sheets are substantially in exposed relation with the air as mentioned in the foregoing, vapor generated normally gradually escapes in the air either directly or through vessels in the veneer sheets. Accordingly, a pressure difference is normally produced between the bonding surfaces and the air. Accordingly, the foaming continues during the hardening reaction of the adhesive. The results are that the adhesive permeates the veneer sheets more than necessary, or is forced out of the bonding surfaces or that the adhesive remaining on the bonding surfaces of the veneer sheets is hardened in caramelized condition. As a result, the resultant product cannot offer an expected sufficient strength.

Of course, it is possible to avoid the foaming of the adhesive by restricting the heating temperature of the bonding agent to a temperature up to or above the boiling point of water in its normal state. However, in this case, the heating is extremely time consuming. In addition some kinds of adhesive are hardened without taking the course by effective reaction. As a result, the resultant product is not practical in use, since the bonding strength thereof is much deteriorated.

In the long run, the conventional means for bonding veneer sheets involves the use of an excessively large quantity of adhesive. Besides, temperature increase of the adhesive is slowed down by latent heat loss, etc. due to vapor leakage. Also, there is a tendency that the heating takes a long time. In addition, the adhesive forced out of the boundary surfaces of veneer sheets and hardened deteriorate quality of the surfaces of the veneer sheets.

The present invention is accomplished in order to overcome the above-mentioned inconveniences inherent in the prior art.

SUMMARY OF THE INVENTION

It is therefore an object of the present invention to provide a method of bonding veneer sheets and an apparatus for carrying out the same, wherein evaporation of moisture contained in the adhesive is restrained and foaming of the adhesive is either prevented or decreased extensively during the hardening procedure.

Another object of the present invention is to provide a method of bonding veneer sheets and an apparatus for carrying out the same, wherein temperature increase of the adhesive is effectively enhanced and time required for heating is shortened considerably.

A further object of the invention is to provide a method of bonding veneer sheets and an apparatus for carrying out the same, wherein the adhesive is effectively prevented from getting forced out of the boundary surfaces between veneer sheets and hot plates.

In order to achieve the above objects, there is essentially provided a method bonding veneer sheets in the manufacture of plywood comprising stacking a plurality of veneer sheets with water soluble thermosetting adhesive interposed at desired locations between said veneer sheets; pressing said veneer sheets from both planar sides by means of at least two plates each having an area larger than said veneer sheets such that said at least two plates overhang the veneer sheets to oppose each other across a gap defined around peripheries of the stacked veneer sheets; sealing said gap in air tight condition; heating said thermosetting adhesive at a temperature above the boiling point of water under a normal state such that said thermosetting adhesive is hardened without foaming.

There is also essentially provided an apparatus for bonding veneer sheets in several layers comprising a plurality of plates including a first plate and a second plate adapted to move toward and away from each other to press a plurality of stacked veneer sheets therebetween, said plurality of veneer sheets having water soluble thermosetting adhesive interposed at desired locations therebetween, said first and second plates being heated up to a temperature above the boiling point of water under normal state, each of said first and second plates having an area larger than said veneer sheets such that said first and second plates overhang the veneer sheets to oppose each other across a gap defined around peripheries of said stacked veneer sheets; and annular sealing means for sealing said gap around said stacked veneer sheets, said annular sealing means having an axial size larger than the stacked veneer sheets.

BRIEF DESCRIPTION OF THE DRAWINGS

The present invention itself, together with other objects and advantages thereof, will be best understood from the following detailed description of the illustrated embodiments when read in conjunction with the accompanying drawings, in which.

DETAILED DESCRIPTION OF THE EMBODIMENTS

A preferred embodiment of the present invention will be described hereunder with reference to the accompanying drawings.

Figure 1:
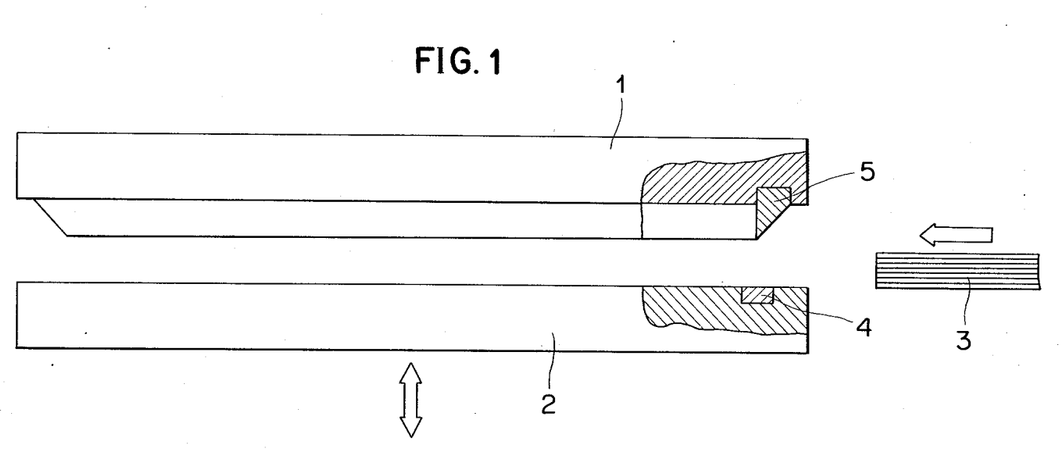
FIG. 1 is a side view, partly exploded, of one embodiment of the present invention.

In FIG. 1, reference numerals 1 and 2 denote hot plates which are heated up to a temperature of the boiling point or more of water in its normal state by a suitable heat source such as, for example, heating steam, heating oil, electric electric heater, etc. The hot plates 1 and 2 are moved toward and away from each other by an actuator (not shown) comprising, for example, a hydraulic cylinder, etc. The hot plates 1 and 2 are adapted to press from above and below a plurality of veneer sheets 3 stacked up with water soluble thermosetting adhesive interposed at desired locations. Each plate has an area larger than the stacked veneer sheets 3 such that said plates 1 and 2 overhang the stacked veneer sheets 3 to face each other across a gap defined therebetween around the peripheries of the stacked veneer sheets. The water soluble thermosetting adhesive is heated and hardened by the hot plates through the veneer sheets.

Figure 2:
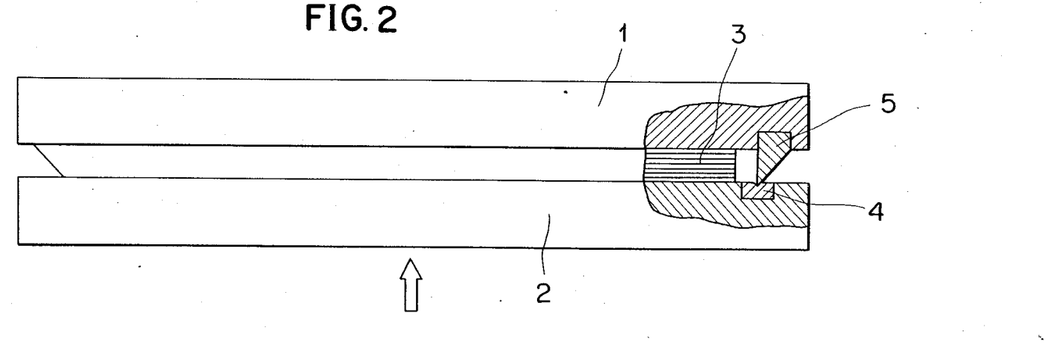
FIG. 2 is likewise a side view, partly exploded, of the above for explaining operating state thereof.

Reference numeral 4 denotes a resilient annular member comprising, for example, silicone rubber, fluorine-contained, etc. buried in the lower hot plate 2 at a location adjacent the peripheries of the veneer sheets 3. Reference numeral 5 denotes a rigid annular member comprising, for example, metal, hard synthetic resin, etc. and which is projected from a location opposite the resilient annular member 4 of the upper hot plate 1, so that the rigid annular member 5 may pressure contact the resilient annular member 4. The resilient annular member 4 and the rigid annular member 5 are pressure contacted with each other at a time when the veneer sheets 3 are pressed to seal the gap between the hot plates 1 and 2 around the peripheries of the veneer sheets 3. A method of bonding veneer sheets is carried out by using, for example, an apparatus having the aforementioned construction. As shown in FIG. 2, a plurality of veneer sheets 3 stacked up in several layers with water soluble thermosetting adhesive interposed at desired locations are inserted between the hot plates 1 and 2. The veneer sheets 3 are pressed and heated from above and below. At the initial stage when the temperature of the adhesive is raised up to approximately 100° C. as the veneer sheets 3 are heated, foams are produced in the adhesive due to boiling and evaporation of moisture contained therein. However, since an air tight gap is defined at the vicinity of the peripheries of the veneer sheets 3 by the resilient annular member 4 and the rigid annular member 5, pressure at the periphery of the veneer sheets 3 and internal pressure of the veneer sheets 3 are gradually increased and equalized, the foaming of the adhesive is restrained and the adhesive is hardened. Accordingly, bonding strength of the adhesive is significantly increased compared with that of the prior art. At the same time, temperature increase of the adhesive is enhanced as the pressure is increased and equalized. Thus, the time required for pressing and heating is shortened.

In order to confirm the foregoing, plywood produced by the conventional method, wherein water soluble adhesive commonly used for plywood comprising, chiefly, a melamine and urea coplycondensation resin added with water and extending agent of a general mixing ratio is applied to each of veneer sheets generally in a quantity of 30 g/square feet, and plywood produced by a process of bonding veneer sheets according to the present invention were prepared for comparison. An immersion and adhesion test of one kind was carried out concerning both of them for comparison. As a result, bonding force of the latter was found to increase by ten to twenty % on average as compared with that of the former. Furthermore, plywood produced by a method of bonding veneer sheets according to the present invention but with decreased application quantity of the adhesive by about 4%, and plywood produced by a method of bonding veneer sheets according to the present invention but with time for pressing and heating shortened by about 6% were prepared and compared with the plywood produced by the conventional method. The result was that the plywoods produced by the method of the present invention were superior in bonding force to the conventional one. Another test was carried out on plywood having comparatively high moisture content. This time, the plywoods were produced with the same application quantity of the adhesive and the same time for pressing and heating. The result of the comparison was that the plywood produced by the method according to the present invention was superior in the bonding force to that of the conventional method.

Although it is convenient to use hot plates heated by a suitable heat source as means for heating the adhesive in the state where the veneer sheets are pressed from above and below as used in the case of the apparatus according to the second embodiment described, a conventional hot press may be improved for such use. Alternatively, there may be employed another means (not shown), wherein the upper and lower surfaces of the veneer sheets are pressed by an anchor plate and at the same time, a high frequency electric current is applied for heating the adhesive by using a high frequency electric current oscillator, etc. Said another means is preferable especially when the thicknesses of the layers of the veneer sheets are comparatively large or when used to produce pressed plywood, etc. Also, there may be employed any other means as long as it is capable of heating the adhesive in the state where the veneer sheets are pressed from the upper and lower surfaces. In any event, members such as hot plates, anchor plates, etc. which are closely contacted to the upper and lower surfaces of the veneer sheets are not necessarily smooth in their upper surfaces. They may be formed with, for example, fine irregularities or curved in a desired shape in order to equalize and spread the pressure-tightening force, as long as they have a substantially air tightening property.

Figure 3:
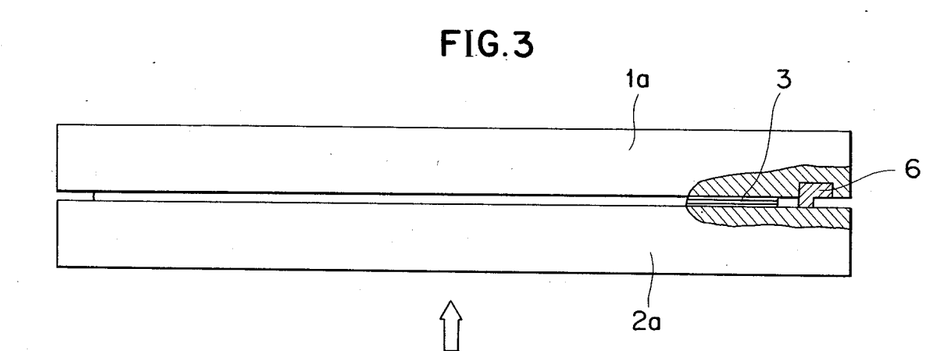
FIGS. 3 and 4 are schematic side views, partly exploded, for explaining other embodiments of the present invention.
Figure 4:
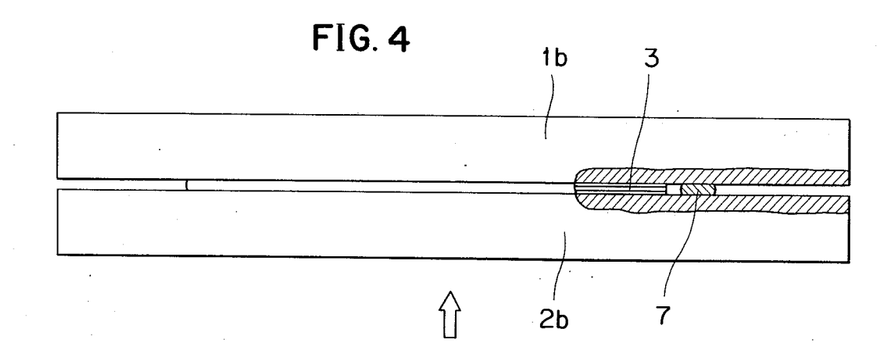

As means for sealing the gap in the vicinity of the periphery of the veneer sheets, the lower plate 2 contacting the lowest veneer sheet is buried therein with annular member 4 having an elastic property. At the same time, the upper plate 1 contacting the uppermost veneer sheet 3 is provided with an annular member having a rigid property projecting therefrom for sealing the gap defined around the peripheries of the veneer sheets between the plates 1 and 2. In this way, existence of the resilient member makes it possible to suitably adapt to the irregularities of the thickness of the layers of the veneer sheets observed at the initial stage of operation and to follow the diminished thickness of the veneer sheets due to the tightening under pressure. In addition, the provision of the projecting rigid annular member makes it possible to effect a stable and reliable seal which is not adversely affected by the thickness of the layers of the veneer sheets and the internal pressure. However, in the case where the heating is effected at a comparatively low temperature, or the total thickness of the layers of the veneer sheets is comparatively thin, as shown for example in FIG. 3, the hot plate 1a which contacts the upper surface of the top veneer sheet 3 may be provided with a resilient annular member 6 of a desired shape projecting therefrom to pressure contact the hot plate 2a which contacts the upper surface of the veneer sheets 3 without jeopardizing practical use. In the case where the veneer sheets are frequently altered in dimension and shape, a necessary number of resilient annular members having a dimension and shape fitted to those of the respective veneer sheets should be prepared, and as shown for example in FIG. 4, a resilient annular member 7 having a corresponding dimension and shape may be simply disposed in a location adjacent the vicinity of the peripheries of the veneer sheets 3 between the hot plates 1b and 2b. Of course, a member not having an elastic property may suitably be used as long as it has means for substantially sealing the gap defined between the plates in the vicinity of the peripheries of the veneer sheets in an air-tight state. In any event, the sealing is preferably done at a location as near as possible to the peripheries of the veneer sheets.

Of course, the adhesive is not required to be applied to all over the surfaces of the veneer sheets which are being pressed. Several sheets of plywood may be produced all at once by partly omitting the interposition of the adhesive. Also, such materials as, for example, coloring agent, coating material, etc. adapted to use for other purposes than bonding may be employed in addition to the adhesive according to necessity.

Pressing, heating and sealing are not necessarily simultaneously started and stopped. Suitable time difference may be allowed among them depending on various conditions such as thickness of the layers of the veneer sheets, hardening state of the adhesive, etc.

As is apparent from the foregoing description, a method of bonding veneer sheets according to the invention can be carried out in various forms. In any event, the effect of carrying out the method is extremely remarkable. It serves to reduce the production cost and increase the productivity.

Also, as is apparent from the foregoing description, an apparatus according to the second embodiment of the present invention is adapted to carry out the method of bonding veneer sheets according to the second embodiment. The form of the apparatus is not limited to that of the preferred embodiment described. For example, hot plates may be arranged in more than two stage structure in order to produce many sheets of plywood all at once. Alternatively, a plurality of hot plates may be disposed side by side but in horizontal relation so that they can be operated just like a horizontal press.

The resilient annular member is preferably formed of a raw material having a heat resisting property such as, for example, silicone rubber, fluorine-contained, etc. In the case where the resilient annular member is operated in a vertical press form, as shown in the foregoing embodiment, the member is buried in the upper surface of the hot plate so that it lies in the same plane as that of the hot plate. In this way, the veneer sheets can be easily inserted in and taken out.

The rigid annular member is also preferably formed of a raw material having a heat resisting property such as, for example, metal, hard synthetic resin, etc. More preferably, the front end of the rigid annular member is formed sharp edge. In this way, intimacy to the resilient annular member is improved. Also, screw means may be provided so that replacement thereof can be facilitated.

Now, an apparatus for bonding veneer sheets according to a third embodiment of the present invention will be described with reference to FIGS. 5 through 9.

Figure 5:
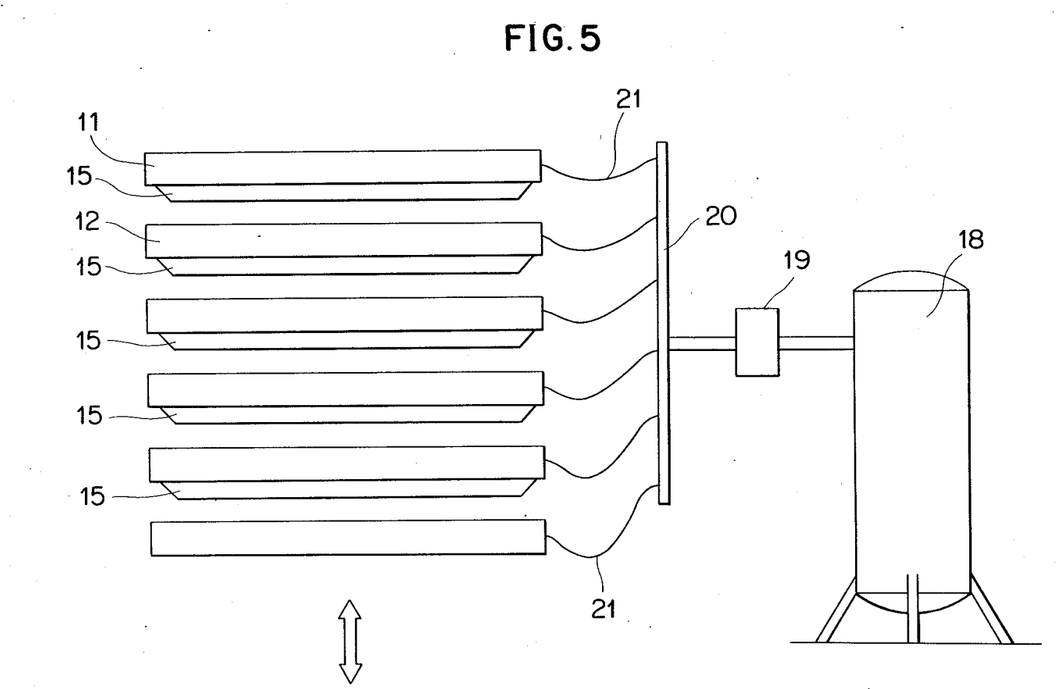
FIG. 5 is a schematic side view of a further embodiment of the present invention.
Figure 6:
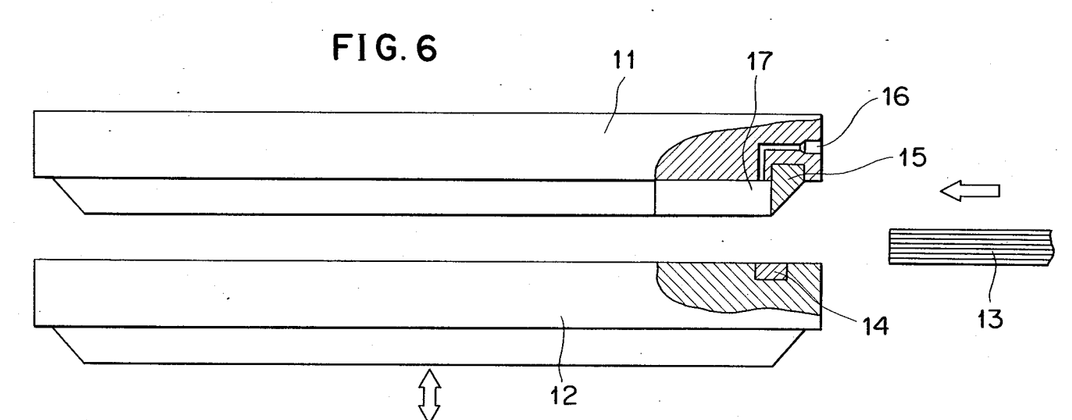
FIG. 6 is a schematic side view, partly exploded, of a still further embodiment of the invention.

FIG. 5 illustrates a schematic side view of the whole body of an apparatus for bonding veneer sheets according to the third embodiment of the present invention. FIG. 6 is a schematic side view, partly exploded, for explaining details of the hot plates.

In the figure, reference numerals 11 and 12 denote hot plates which are heated up to the boiling point or more of water in its normal state by a suitable heat source such as, for example, heating steam, heating oil, electric heater, etc. The hot plates 11 and 12 are separatably disposed side by side by an actuator (not shown) comprising, for example, a hydraulic cylinder, etc. The hot plates 11 and 12 are caused to press a plurality of veneer sheets 13 stacked up with adhesive interposed at desired locations from both upper and lower surfaces thereof. The adhesive is heated and hardened by the hot plates through the veneer sheets.

Reference numeral 14 denotes a resilient annular member comprising, for example, silicone rubber, fluroine-contained, etc. buried in one of the hot plates 12 opposite the other at a location in the vicinity of the peripheries of the veneer sheets 13. Reference numeral 15 denotes a rigid annular member comprising, for example, metal, hard synthetic resin, etc. which projects from a location opposite the resilient annular member 14 of the other hot plate 11 opposite the hot plate 12.

Both the resilient annular member 14 and the rigid annular member 15 are disposed opposite each other so that they are brought to be in pressure contact with each other when the veneer sheets 13 are tightened under pressure. Both of them constitute as a pair a sealing member which seals the gap formed between the plates 11 and 12 in the vicinity of the peripheries of the veneer sheets 13 when the veneer sheets 13 are tightened under pressure to form a sealed chamber.

Reference numeral 16 denotes an inlet port defined in the outer surface of the hot plate 11 and in the vicinity of the inner side of the rigid annular member 15, and adapted to introduce a high pressure gas. When the veneer sheets 13 are tightened under pressure, the inlet port 16 introduces a high pressure gas from a discharging mechanism comprising a storing tank 18, solenoid opening and shutting valve 19, distribution pipe 20, elastic pipe 21, etc. The gas, which may be a high pressure gas such as compressed air at a higher pressure than saturation vapor pressure proportioned to the heating temperature of the hot plates 11 and 12 into is discharged the sealed chamber 17 defined by the hot plates 11 and 12, and the sealing means including the resilient annular member 14, and the rigid annular member 15.

Figure 7:
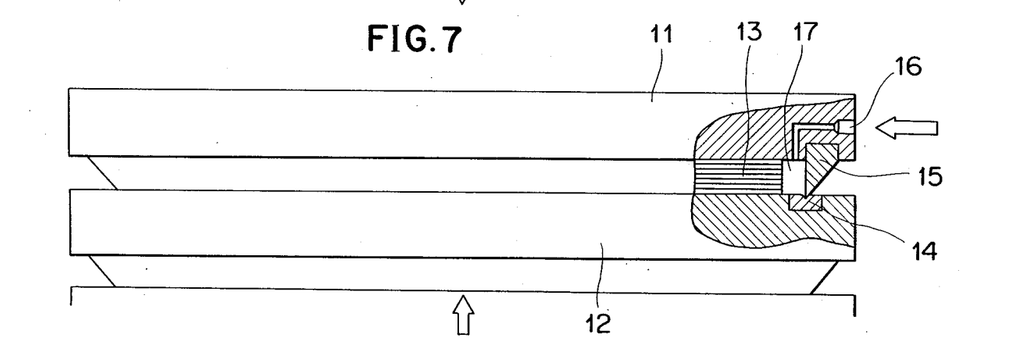
FIG. 7 is a schematic side view, partly exploded, for explaining operating state of the apparatus illustrated in FIGS. 5 and 6.
Figure 8:
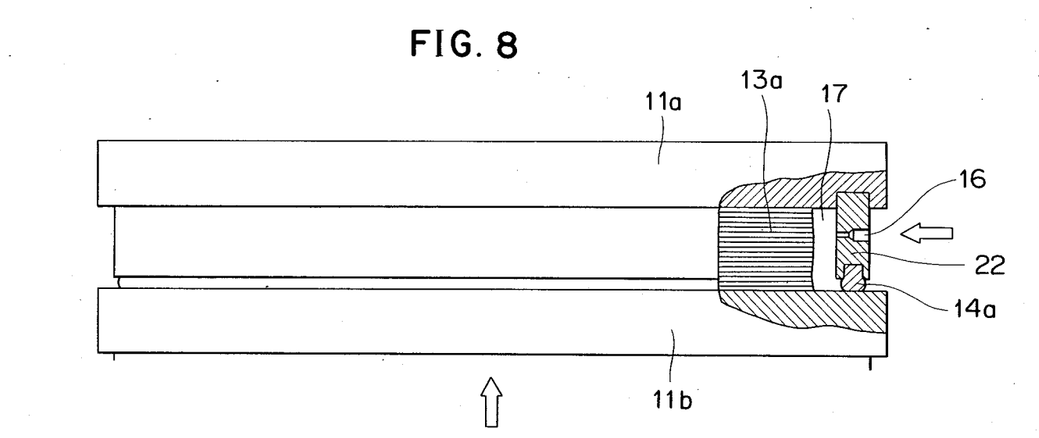
FIGS. 8 and 9 are schematic side views, partly exploded, of a still further embodiments of the present invention.

Since an apparatus for bonding veneer sheets according to the third embodiment is constituted as described in a foregoing, for example, as apparent from FIG. 7, when the plurality of veneer sheets 13 stacked up in several layers with water soluble thermosetting adhesive interposed at desired locations are inserted between the hot plates 11 and 12, and pressed from both the upper and lower surfaces thereof and heated, and a high pressure gas such as compressed air, etc. having a higher pressure than a saturation vapor pressure proportioned to the heating temperature of the hot plates 11 and 12 is introduced into the sealed chamber 17 from the discharging mechanism through the high pressure gas inlet port 16, even at the time when the temperature of the adhesive applied to the bonding surfaces of the veneer sheets 13 is raised up to a temperature of the boiling point or more of water in its normal state, i.e. in the vicinity of 100° C. by heating, the veneer sheets 13 are exposed to a higher pressure than a saturation vapor pressure proportioned to the heating temperature wherein boiling and evaporation of moisture contained in the adhesive is restrained, so that the adhesive is hardened while foaming is prevented or at least significantly reduced. Accordingly, bonding strength of the adhesive is significantly increased as compared with the prior art. At the same time, a latent heat loss is prevented due to restraint of boiling and evaporation of the moisture with the result that temperature increase of the bonding agent is effectively enhanced while the heating time is shortened as compared with the prior art. Morever, the disadvantage that the adhesive is forced out of the boundary surfaces between the veneer sheets and the hot plates and hardened can be eliminated or at least decreased significantly. Thus, quality of the outer surface of the veneer sheets is improved extensively as compared with the prior art.

In order to show the difference between the prior art and the present invention, plywood produced by the conventional method, wherein water soluble thermosetting adhesive commonly used for plywood production comprising a melamine and urea copolycondensation resin containing water and an extending agent of a general mixing ratio is applied to each veneer sheet normally in an amount of 30 g/square feet, and plywood produced by a process of bonding veneer sheets according to the third embodiment of the present invention were prepared in a large number for comparison. The class I immersion and adhesion test was carried out on both of them for comparison. As a result, it was found that bonding force of the latter increased by twenty to thirty % on average as compared with that of the former. Furthermore, plywood was produced by a method of bonding veneer sheets according to the third embodiment of the present invention but with the application quantity of the adhesive saved by about 6%. At the same time, plywood was produced by a method of bonding veneer sheets according to the third embodiment of the present invention but with shortened time for tightening under pressure and heating by about 9%. A large number of sheets of such plywood were compared with the plywood produced by the conventional method. The result was that the plywoods produced by the method of the present invention were superior in bonding force to the conventional ones. Another test was carried out on veneer sheets containing comparatively high moisture content exceeding a proper moisture content of plywood by ten to twenty %. This time, the plywood prices were reduced by using the same quantity of the adhesive while heat pressing them. The result of the comparison was that the plywood produced by the method according to the third embodiment of the present invention was superior in the bonding force to that of the conventional method. Of course, the adhesive was not required to be applied all over the surfaces of the veneer sheets being pressed. Several sheets of plywood were successfully produced all at once by partly omitting the interposition of the bonding agent. Also, such materials as, for example, coloring agent, coating material, etc. adapted to use for other purposes than bonding were successfully employed in addition to the adhesive according to necessity. The provision of a suitable stacking time during the interval from the time when the adhesive was disposed on the bonding surfaces of the veneer sheets till the time when the heating was applied, or cold pressing the stacked veneer sheets before heating were proved to be effective for improvement of adhesibility. However, in the case where a veneer sheet at the uppermost surface layer was considerably thin, there was a possibility that the adhesive oozes out. In such a case, suitable selection of viscosity of the adhesive, stacking time, cold pressing time, etc. was effective.

The hot plates to be used in the apparatus for bonding the veneer sheets according to the third embodiment of the present invention are not necessarily smooth in their front surfaces. They may be formed with fine irregularities or curved in a desired shape as long as they have a sufficient sealing effect to assure uniform pressing. Of course, the hot plates may be disposed side by side in horizontal relation so that they can be operated as a horizontal press.

Figure 9:
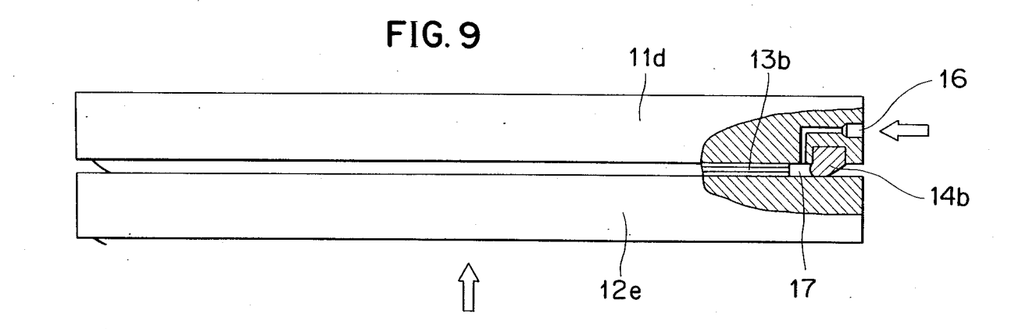

As preferable means for sealing the gap in the vicinity of the peripheries of the veneer sheets in the apparatus according to the afore-mentioned embodiment, a resilient annular member is provided to one of the opposing plates, and a rigid annular member is provided to the other hot plate as a pair. In this way, it is possible to suitably adapt to the uneven thickness of the veneer layers which is often observed at the early stage such that the sealing means well follows the reduced veneer layer thickness as a result of pressing. In addition, it is possible to effect a stable and reliable sealing which is not adversely affected by the veneer layer thickness or the high pressure introduced to the sealed chamber. Particularly, as shown in the figure, the constitution of the rigid annular member with its tip end sharpened is effective for improving the sealing effect. However, a similar effect could be obtained even when the sealing means comprises, as shown for example in FIG. 8, a rigid annular support member 22 projected from one of the opposing hot plates 11b at a location adjacent the vicinity of the peripheries of the veneer sheets, and the resilient annular member 14a attached to the holding member 22 in such a manner as to pressure contact to the other hot plate 11b such that the gap in the vicinity of the periphery of the veneer sheets is sealed in an air-tight manner. In the case where the pressure of the high pressure gas introduced into the air-tight chamber is comparatively low, or the veneer layer thickness is comparatively thin, sealing means of a desired shape may be mounted to one of opposing hot plates 11d at a location in the vicinity of the peripheries of the veneer sheets in such a manner as to project therefrom to pressure contact to the other hot plate 11e to seal the gap in the vicinity of the peripheries of the veneer sheets 13b without jeopardizing practical use. It was confirmed that a sealing means of any shape can be employed as long as it can substantially seal the gap in the vicinity of the peripheries of the veneer sheets.

However, the sealing means is selected in its material, shape, etc. taking heat resistance, wear resistance, mechanical strength, etc. as well as its mounting means into good consideration such that the sealing means will not be deformed nor worn, and the high pressure gas will not leak in a large quantity due to repeated introduction of the high pressure gas for a long period of time, heating, etc. Provision of screw means is convenient for possible replacement of the sealing means at the time when the member is worn. Particularly, as shown in the respective embodiments, when used in a vertical press, it was found to be convenient that the lower side hot plate is formed flat at its upper surface, so that the veneer sheets can be easily inserted and taken out. In any event, it was confirmed by the test that the degree of the air-tightness of the sealed chamber in vicinity of the periphery of the veneer sheets by using the sealing means described is good enough for practical use even if the high pressure gas leaks slightly as long as the inside of the sealed chamber can be normally maintained in a desired high pressure state. Accordingly, the term "sealing" used in the specification is not necessarily limited to a strict air-tight state.

As for the high pressure gas to be introduced to the sealed chamber defined by the opposing hot plates and the sealing means when blocked, compressed air is inexpensive, handy and effective. However, for example, various kinds of inert gas, heating steam, etc. may be employed with satisfactory results. The high pressure gas may be introduced to the air-tightening chamber at any suitable time before the foaming of the adhesive is produced. Preferably, in the case the heating steam is employed, a dried heating steam containing a relatively a small quantity of moisture should be employed, and the high pressure gas should be introduced to the airtight chamber at a relatively early time after the latter is sealed. The pressure of the high pressure gas is good enough as long as it is higher than the saturation vapor pressure proportioned to the heating temperature of the hot plates. However, in order to obtain the best effect, the pressure of the high pressure gas should be made higher by about 1 to 3 times the normal pressure than the saturation vapor pressure proportioned to the heating temperature of the hot plates. Moreover, if no inconvenience is seen, even more pressure difference than the foregoing may be employed.

Also, the introduction inlet port for the high pressure gas may be formed at a suitable location on at least one of the hot plate and the sealing means. However, since the high pressure gas introduced to the air-tight chamber is preferably discharged before the sealing is disabled, the discharging mechanism for discharging the high pressure gas is preferably provided, as described in the foregoing embodiments, with a solenoid opening and shutting valve, etc. in order to improve the reliability of the introduction and discharge. In any event, the effect of the invention is extremely great. The apparatus according to the third embodiment of the present invention serves to reduce bonding cost and improve productivity extensively.

While specific embodiments of the present invention have been shown and described in detail to illustrate the application of the principles of the invention, it will be understood that modifications may be made in such embodiments without departing from such principles.

What is claimed is:

1. A method for bonding veneer sheets in the manufacture of plywood comprising:

stacking a plurality of veneer sheets with water-soluble thermosetting adhesive interposed at desired locations therebetween;

pressing said veneer sheets from both planar sides by means of at least two plates each having an area larger than said veneer sheets such that opposed portions of said plates define a gap extending around the peripheries of the stacked veneer sheets;

sealing said gap in airtight condition so as to leave an enclosed space around said stacked sheets;

heating said thermosetting adhesive at a temperature above the boiling point of water under a normal state; and introducing gas under pressure into said enclosed space to restrain boiling and evaporation of moisture contained in said adhesive, whereby the adhesive is hardened without subtantial deleterious foaming thereof.

2. An apparatus for bonding veneer sheets in several layers comprising first and second plates adapted to be moved towards and away from each other to press therebetween a plurality of stacked veneer sheets with water-soluble thermosetting adhesive interposed at desired locations therebetween, each of said first and second plates having an area larger than said veneer sheets such that opposed portions of said plates define a gap extending around the peripheries of said stacked veneer sheets;

a ridid annular member mounted on said one of said plates and surrounding the stacked veneer sheets in spaced relation thereto;

a resilient annular member buried in the other of said plates and facing said rigid annular member across the gap;

said rigid annular member being adapted to engage said resilient annular member when said first and second plates are moved towards each other to press the stacked veneer sheets therebetween to seal said gap and leave an enclosed space around said stacked sheets;

means for heating said first and second plates to a temperature above the boiling point of water under normal state;
means including an access port in one of said plates communicating with said enclosed space; and
means for introducing a compressed gas through said port into said enclosed space to restrain boiling and evaporation of moisture contained in said adhesive, whereby the adhesive is hardened without substantial deleterious foaming thereof.

* * * * *